W. C. GIBSON.
POST HOLE AUGER.
APPLICATION FILED JAN. 19, 1912.
1,064,825.
Patented June 17, 1913.
2 SHEETS—SHEET 1.
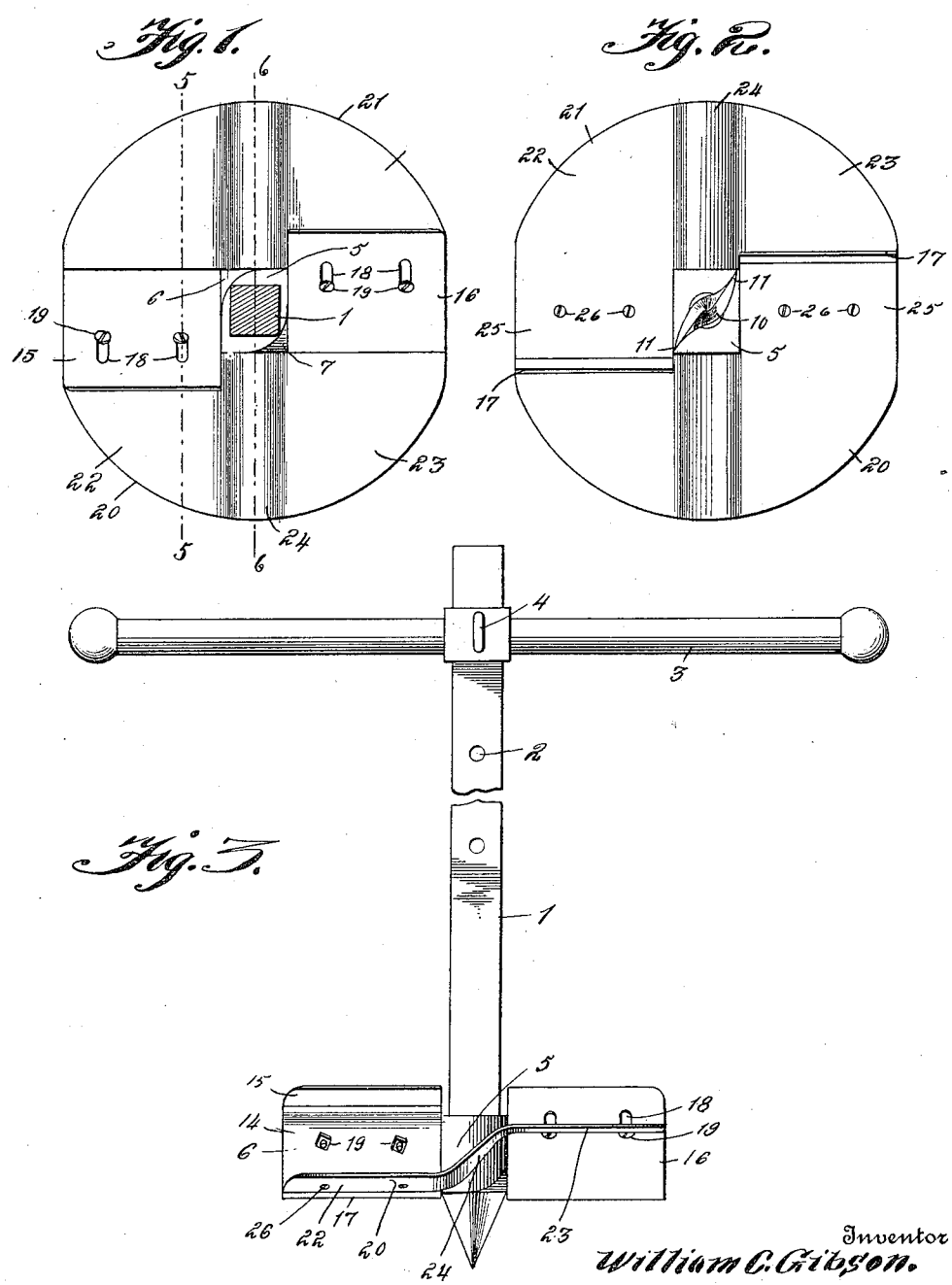

W. C. GIBSON.
POST HOLE AUGER.
APPLICATION FILED JAN. 19, 1912.
1,064,825.
Patented June 17, 1913.
2 SHEETS—SHEET 2.
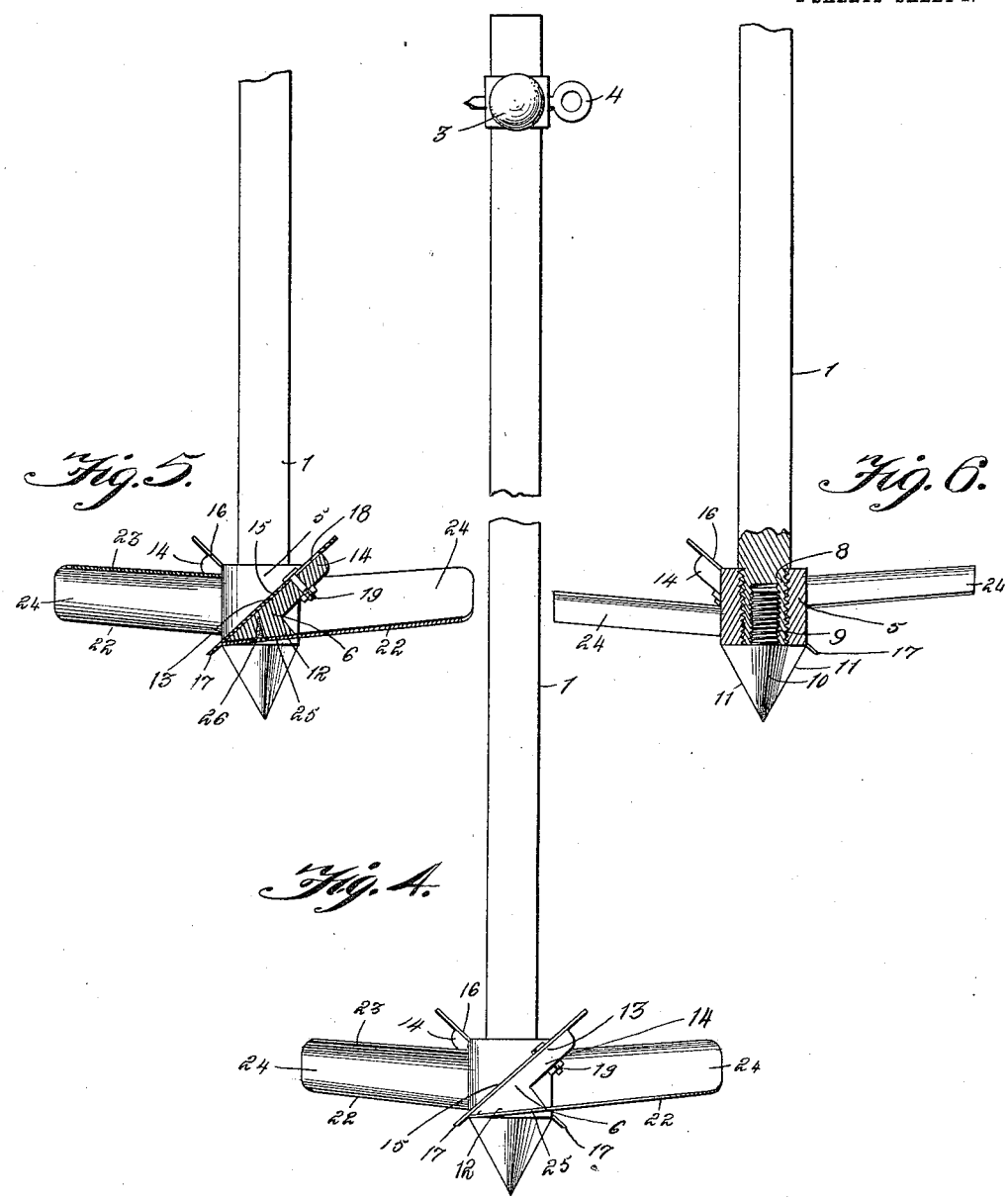
Witnesses
Wm. F. Garner
C. C. Hines
Inventor
William C. Gibson.
By Victor J. Evans
Attorney

UNITED STATES PATENT OFFICE.

WILLIAM C. GIBSON, OF SHAWNEE, OKLAHOMA.

POST-HOLE AUGER.

1,064,825.

Specification of Letters Patent.   Patented June 17, 1913.

Application filed January 19, 1912.   Serial No. 672,055.

*To all whom it may concern:*

Be it known that I, WILLIAM C. GIBSON, a citizen of the United States, residing at Shawnee, in the county of Pottawatomie and State of Oklahoma, have invented new and useful Improvements in Post-Hole Augers, of which the following is a specification.

This invention relates to post hole augers, and its object is to provide a device of this character which will effectually cut into the earth and lift the free soil so as to prevent choking of the cutters, and which is adapted to permit of the free withdrawal of the tool and loose earth from the bore at the necessary periods.

A further object of the invention is to provide a post hole auger which is simple of construction, easy of operation, capable of use without excess surface friction and in various kinds of soils, and adapted to effectually retain the loose earth for removal.

The invention consists of the features of construction, combination and arrangement of parts, hereinafter fully described and claimed, reference being had to the accompanying drawings, in which:—

Figure 1 is a top plan view of a post hole auger embodying my invention. Fig. 2 is a bottom plan view of the same. Figs. 3 and 4 are side elevations of the auger taken at right angles to each other. Fig. 5 is a section on the line 5—5 of Fig. 1. Fig. 6 is a section on the line 6—6 of Fig. 1.

Referring to the drawings, 1 designates the auger shaft which is of suitable length and provided at its upper end with a series of transverse openings 2. A handle bar 3 is provided with a thickened, slotted central portion slidably engaging the shaft and formed with openings for the passage of a pin 4, which is also adapted to be passed through one of the openings 2, to adjustably connect the handle with the shaft, whereby the handle may be arranged at any desired elevation for the convenience of the operators. Mounted upon the lower end of the shaft is the auger proper, comprising a body 5 having a pair of oppositely extending arms 6 and 7, said body and arms being preferably formed of a single casting. As shown, the body 5 is perforated for the passage of a reduced portion 8 of the shaft, which is threaded thereinto, and provided with a threaded socket to receive the threaded shank 9 of the auger bit 10. The bit 10 is longitudinally tapered to a point and provided with spiral cutting teeth 11 to readily and easily enter the ground in advance of the main cutter.

The arms 6 and 7 have sloping lower faces 12 and inclined or sloping upper faces 13, the said sloping faces inclining downwardly and forwardly in the direction of rotation of the auger. The upper portions of the arms terminate in flanges 14 which project rearwardly beyond the line of the faces 12.

The inclined or sloping faces 13 of the arms 6 and 7 support correspondingly inclined main cutting blades 15 and 16, having lower projecting cutting edges 17 and provided adjacent their upper ends with longitudinal slots 18 through which pass bolts or screws 19, whereby the cutting blades are adjustably secured to the arms, so that their cutting edges may be arranged to project the desired distance beyond the forward edges of the arms. The said cutting blades are of a length to project at their rear edges beyond the flanges 14, through which the bolts 19 pass.

Substantially segmental plates 20 and 21 are arranged on opposite sides of and parallel with the arms 6 and 7, which plates may be made of sheet steel or other suitable material. Each of these plates comprises a shelf portion 22 and a guard portion 23, said guard portion being projected above the plane of the shelf portion by an upturned portion or offset 24. The shelf portion 22 has an attaching extension 25 which projects beneath and is secured by bolts or screws 26 to the sloping face 12 of the adjacent arm 6 or 7, while the guard or offset portion 23 is arranged in advance and above the level of the edge of the main cutting plate carried by the other arm.

In practice, the auger is operated by two men grasping the opposite ends of the handle bar 3, who properly position the bit 10 and then turn or rotate the auger until the bit fully enters the ground and the main cutters 15 and 16 come into play. In the further rotation of the tool, said cutters 15 and 16 cut through and elevate the free portions of the soil, which slides upward over their inclined faces and drops down upon the shelves 22. As the cutter is turned, the attaching portions 25 of the shelves slide into contact with the ground, thus forming wear surfaces which operate with a minimum degree of friction and resistance, while the shelves support the displaced earth until a certain amount has accumulated, and thus preventing choking of the cutters. Each shelf is adapted to support a quantity of earth, which is held thereon and in the pocket or chamber formed by the overhanging flange 12 and rear portion of the cutter plate. The earth thus supported is retained in position and prevented from dropping in front of the following cutter plate by the offset 24 and guard portion 23, over upon which a portion of the earth may pass, when a deep cut is made, and be retained upon the guard plate.

It will be understood, of course, that the auger is removed from the bore at intervals in order to free the same from the loose earth, which may be accomplished by simply lifting the auger out of the bore, whereby the loose earth will be extracted with it. This action is promoted by the retention of the earth on the plates 20 and 21. The advantages of the device will, therefore, be readily understood and appreciated.

The device may be employed for digging fence post and telegraph post holes, and for other analogous uses, and different forms of bits may be attached according to the character of the ground in which the hole is to be formed.

Having thus described the invention, what I claim as new is:

An auger of the character described comprising a shaft, a bit, arms projecting diametrically from the shaft and having upper and lower sloping faces, the lower sloping faces terminating in advance of the rear edges of the arms, cutters secured to the upper sloping faces of the arms and projecting rearwardly therefrom, and plates arranged at the opposite sides of the arms and secured to the sloping lower faces thereof, each of said plates being formed to provide a shelf extending in rear of said sloping face and beneath the superposed portion of the arm and the rearwardly projecting portion of one cutter, and having an extension secured to the adjacent arm, and also formed to provide a guard arranged above and in advance of the other cutter, said shelf and guard being connected by an offset portion elevating the guard above the plane of the shelf.

In testimony whereof I affix my signature in presence of two witnesses.

WILLIAM C. GIBSON.

Witnesses:
CHAS. E. WELLS,
EMMA GERHARDT.

---

Copies of this patent may be obtained for five cents each, by addressing the "Commissioner of Patents, Washington, D. C."